United States Patent [19]
Callas et al.

[11] Patent Number: 5,757,005
[45] Date of Patent: May 26, 1998

[54] ADVANCED X-RAY IMAGING SPECTROMETER

[75] Inventors: John L. Callas, Pasadena; George A. Soli, Lancaster, both of Calif.

[73] Assignee: California Institute of Technology, Pasadena, Calif.

[21] Appl. No.: 745,572

[22] Filed: Nov. 8, 1996

Related U.S. Application Data

[60] Provisional application No. 60/027,655 Oct. 4, 1996.

[51] Int. Cl.$^6$ .................................................. G01T 1/161
[52] U.S. Cl. ............................................. 250/363.06
[58] Field of Search ........................... 250/363.06; 378/2

[56] References Cited

U.S. PATENT DOCUMENTS

| | | | |
|---|---|---|---|
| 4,209,780 | 6/1980 | Fenimore et al. | 378/2 |
| 5,245,191 | 9/1993 | Barber et al. | 250/370.09 |

OTHER PUBLICATIONS

Fenimore, E.E. and Cannon, T.M., "Coded aperture imaging with uniformly redundant arrays", Feb. 1, 1978, *Applied Optics*, vol. 17, No. 3, pp. 7–347.

Ludewigt, J., et al., "A High Rate, Low Noise, X-Ray Silicon Strip Detector System", Aug. 1994, *IEEE Transactions on Nuclear Science*, vol. 41, No. 4, pp. 1037–1041.

S. Holland, "Fabrication of Detectors and Transistors on High Resistivity Silicon", Mar. 1989, *Nucl. Instr. Meth.*, vol. A275, pp. 537–541.

*Primary Examiner*—Don Wong
*Attorney, Agent, or Firm*—Fish & Richardson P.C.

[57] ABSTRACT

An x-ray spectrometer that also provides images of an x-ray source. Coded aperture imaging techniques are used to provide high resolution images. Imaging position-sensitive x-ray sensors with good energy resolution are utilized to provide excellent spectroscopic performance. The system produces high resolution spectral images of the x-ray source which can be viewed in any one of a number of specific energy bands.

17 Claims, 4 Drawing Sheets

ADVANCED X-RAY IMAGING SPECTROMETER

ORIGIN OF INVENTION

The invention described herein was made in the performance of work under a NASA contract, and is subject to the provisions of Public Law 96-517 (35 USC 202) in which the Contractor has elected to retain title.

This application claims the benefits of the U.S. Provisional Application No. 60/027,655, filed on Oct. 4, 1996.

FIELD OF THE INVENTION

The present invention defines an improved x-ray spectrometer. More specifically, the present invention defines an x-ray spectrometer that also provides images of the x-ray source.

BACKGROUND AND SUMMARY OF THE INVENTION

The detection of x-rays is important in many fields, including astrophysics, laboratory microscopy, industrial inspection, and medical imaging. Current x-ray detection systems include imaging systems and spectroscopy systems.

Typical x-ray imaging technology utilizes film or electronic detectors placed in the x-ray stream of interest. However, this approach to x-ray imaging has some drawbacks, including poor spatial resolution and long exposure times. These problems stem, in part, from the limited "optics" (such as lenses and mirrors) that can perform effectively in the x-ray range. As a result, x-ray imaging systems usually have poor spatial resolution. Furthermore, effective electronic sensors for the detection of x-rays often have slow exposure times, and sometimes require sophisticated cooling apparatus.

Current x-ray imaging technology usually does not provide spectrographic information. This information must be obtained using separate equipment, in a separate procedure. Thus, there is a need for x-ray imaging systems with improved performance and which can also provide spectrographic information. Also, there is a need for x-ray imaging apparatus with shorter exposure times. In the field of microscopy, for example, a high resolution x-ray microscope would fill a large gap that exists in expense and difficulty between light microscopy and electron microscopy.

Current x-ray spectrometers may offer relatively good energy resolution. However, they do not provide adequate information regarding the spatial features in the x-ray source. Thus, there is a need for a spectrometer that can also provide images of the x-ray source so that the exact location of particular spectrographic features can be determined. Accordingly, a single system that provides both x-ray imaging and x-ray spectroscopy would solve a number of the above problems in both fields.

The inventors of the present invention have devised a way to combine high resolution x-ray imaging with high resolution spectroscopy in a single instrument. The present invention uses coded aperture imaging techniques to provide high resolution images. Also, the invention employs imaging position-sensitive x-ray sensors that have good spectroscopic performance, that is, good energy resolution. To accomplish this, an aspect of the invention employs x-ray sensors having a deeply-depleted, high purity silicon in combination with on-pixel electronics. The detectors have high sensitivity, high resolution, and low noise with little cooling required.

The deeply-depleted characteristic of the detector is achieved by the use of a very thick detector. For example, the detector may be 500 microns thick, or more. A thick detector means a thick depletion region can be created in the detector. Since x-rays are only sensed within the detector in the depleted region, this extra thickness gives the detector more stopping power, resulting in higher sensitivity. Also, this design permits higher energy x-rays to be detected, such as those up through 40 keV. The use of high purity silicon detectors with on-pixel electronics in the detector results in a detector with low leakage current, and low noise operation. This permits fine-spectroscopy at or near room temperature, avoiding the above-discussed requirement of sophisticated cooling apparatus.

These high resolution, two dimensional detectors are arranged in a large format array disposed to receive x-rays through the coded aperture. High speed, high resolution analog to digital conversion is performed for each x-ray photon detected in each pixel of the device preserving the spectral information of the x-ray photon. Off-line deconvolution techniques are applied to the data to generate high resolution spectral imaging. As a result, the present invention provides both high resolution x-ray imaging and spectroscopy simultaneously. This information can be used, for example, to provide separate spectral images of an x-ray source for each defined energy band.

The present invention is useful in many fields. One example of spectroscopic imaging made possible by the present invention is in the field of space physics or astrophysics. Separate spectral images in selected energy bands can reveal the precise location of specific atomic elements, such as silicon or aluminum, because of the known wavelengths associated with x-rays emitted by those materials. Thus, these spectral images of a planet would show the precise distribution of silicon, aluminum, or other elements.

BRIEF DESCRIPTION OF THE DRAWING

All of these aspects, and others, will be described with reference to the accompanying drawings wherein.

DESCRIPTION OF THE PREFERRED EMBODIMENTS

Presently preferred embodiments of the x-ray imaging spectrometer of the present invention are set forth herein with reference to the accompanying drawings. The embodiment comprises four primary components; a coded aperture, a large format detector unit; a processor; and a display unit. While conventional x-ray detectors provided either imaging or spectroscopic information, the embodiment performs imaging and spectroscopy simultaneously. As a result, with the embodiment, high resolution images of an x-ray source can be produced in selected energy bands.

Figure 1:
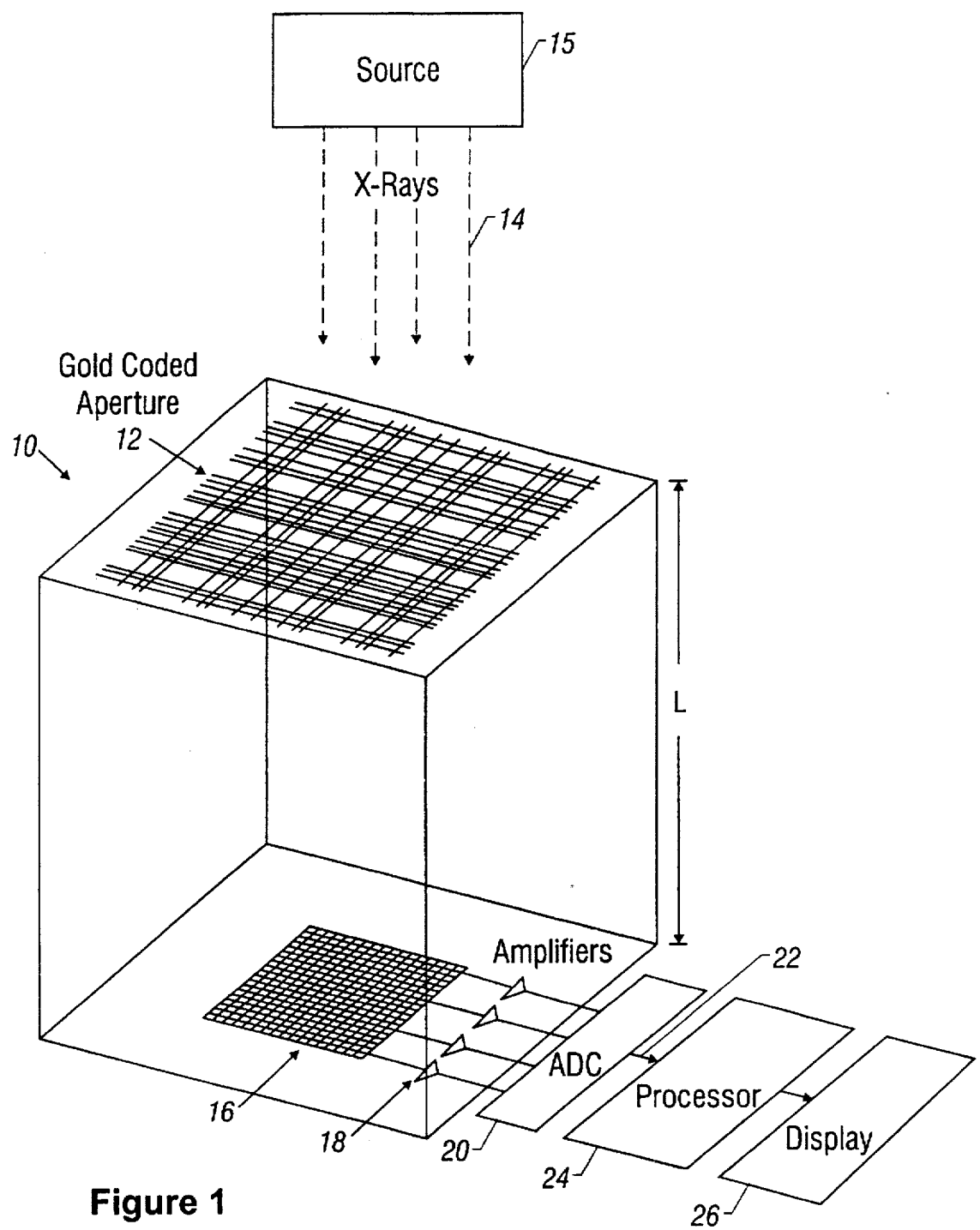
FIG. 1 shows a diagram of the x-ray imaging spectrometer of the present invention.

FIG. 1 shows a diagram of the x-ray imaging spectrometer 10 of the embodiment. The x-ray imaging spectrometer 10 comprises an aperture known as a "coded aperture" 12, which is disposed to receive x-rays 14 from a source 15. The source may comprise, for example, the aperture of an instrument receiving x-rays from an object in space. An x-ray detector 16 is disposed a distance L from the coded aperture 12 to receive those x-rays 14 which have passed through the coded aperture. The x-ray detector 16 is a two dimensional, large-format, position sensitive, deeply-depleted, high purity silicon detector array. In the preferred embodiment, the x-ray detector 16 employs on-pixel, low noise, preamplifiers. There is one detector located at each pixel. Each detector 16 senses the number of x-ray photons received, as well as their energy. This information is sent to a series of amplifiers 18 which amplify the signals. The amplified signals are then transmitted to an analog to digital converter 20, which converts the analog signals into digital signals.

These digitized signals are then sent on line 22 to a processor 24 which performs signal processing and deconvolution. In effect, the deconvolution process unfolds the image, which is distorted by convolution after passing through the coded aperture. This results in the reconstruction of the original image. The resulting information is then transmitted to a display unit 26 for viewing and analysis.

The coded aperture 12 in the preferred embodiment is of the type known as a uniformly redundant array (URA). The reason that coded apertures are employed in x-ray imaging is that conventional optics, such as lenses and mirrors, cannot be used because x-rays penetrate conventional materials due to their high energies. The coded aperture is a substitute for conventional optics.

Coded apertures are based on the extension of the well known concept of a pin hole camera. A pin hole camera with only a single opening would have to have a very large opening in order to obtain a reasonable signal-to-noise ratio, because of the weak signals of most x-ray sources. On the other hand, a large hole precludes good angular resolution. Therefore, in order to increase the signal strength, a single pin hole is replaced by many pin holes, collectively called the coded aperture. When light passes through several pin holes in an aperture, each pin hole will deposit a shadow of the aperture on a self illuminating object. This will produce many overlapping images of the object to be imaged, thus achieving, in effect, the signal strength of a larger aperture. However, the resulting overlapping images must be decoded to reconstruct a single image of the x-ray source. The reconstructed image will be of a higher quality than that obtained by the use of a single pin hole because of the larger effective aperture.

The reconstruction procedure gives the location and intensity of each source in the field of view. Basically this is accomplished by detecting the location and strength of aperture patterns in the picture. Reconstruction procedures, discussed in more detail below, generally can be categorized as either deconvolutions, or correlations. The reconstruction process is performed in the processor 24, shown in FIG. 1.

In the preferred embodiment, the coded aperture 12 is constructed out of gold, which is used because of its superior ability to stop x-rays and its ease in fabrication. However, other materials may be used such as tungsten or tantalum.

One method of fabricating the coded aperture uses standard semiconductor processing techniques. A chrome-on-glass reticle containing the mathematically generated coded aperture pattern is fabricated using standard electron-beam lithography. This reticle is then used to expose the coded aperture pattern onto a beryllium substrate coated with a thick-film photoresist. The exposed substrate is then developed to reveal the coded aperture pattern in the photoresist. An electroplate process is used to plate gold into the exposed pattern. The remaining photoresist is then removed.

With this process, coded apertures with features size well below 20 μm in size are possible. Coded aperture to detector separation distances from millimeters to meters can be considered in the instrument design. This permits a broad choice of possible spatial resolutions and instrument fields of view.

Also, it is preferred that the coded aperture 12 be of the type known as a uniformly redundant array. For further details regarding uniformly redundant arrays and other types of coded apertures, see the article, E. E. Fenimore and T. M. Cannon, "Coded Aperture Imaging with Uniform Redundant Arrays", *Applied Optics*, Volume 17, February 1978 pages 337–347, which is hereby incorporated by reference.

The x-ray detector 16 is separated from the coded aperture 12 by distance L. It will be appreciated that spatial resolution is determined by the ratio D/L, where D is the individual pixel pitch and L is the coded aperture-to-detector separation. This separation can be varied to meet different application requirements. For example, increasing L will increase the spatial resolution but will decrease the field of view. Conversely, decreasing L will increase the field of view, but will decrease spatial resolution.

The detector 16 is a large format detector, which, in the preferred embodiment, is an array of 1024×1024 detectors. It will be appreciated that various sizes of detectors may be used. Even a one dimensional array could be employed. With a one dimensional array the system would reconstruct a series of one dimensional images into two dimensions, using well-known computer aided tomography techniques.

It is well known that x-ray detection in the field of x-ray spectroscopy is very difficult due to the high energies of x-rays, which penetrate deeply in most materials. Consequently x-ray spectroscopy techniques are quite different from visible spectroscopy. In visible light spectroscopy, light is broken up into its constituent colors, and each color is imaged or detected separately. X-ray spectroscopy processes the electromagnetic radiation by treating the energy as particles, and not as waves as in visible spectroscopy. Individual photons are counted, and the energy of each individual photon is measured. By plotting the photon count versus energy, a spectrum of the x-ray beam is produced. Bands or spikes in this energy diagram will reveal information about the source of the x-rays.

As discussed above, the present invention uses deeply depleted detectors, which are detectors having a deep depletion region. This is needed because high energy photons, such as x-rays, penetrate relatively deeply into silicon, and x-rays will only be detected in the depletion region of the silicon. The detectors are fabricated on thick n-type silicon wafers. For example, the preferred silicon wafer is 300–500 microns thick. Also, the silicon used will preferably be a high receptivity (6 to 8 kohm-cm) n-type silicon. Also, it is desired that the silicon be fully depleted so that it is sensitive to x-rays over its entire thickness. This is achieved by the use of a relatively high voltage across the silicon. For further details about x-ray detectors of the type used in the present invention and their construction, refer to B. Ludewigt, et al., "A High Rate, Low Noise, X-Ray Silicon Strip Detector System", *I.E.E.E. Transactions on Nuclear Science*, Volume 41 August 1994, pages 1037–1041, which is hereby incorporated by reference. For more specific details regarding techniques used to fabricate these detectors, see S. Holland, "Fabrication of Detectors and Transistors on High Resistivity Silicon", *Nucl. Instr. Meth.*, Volume A275, pages 507–541, March 1989, which is hereby incorporated by reference.

X-ray detectors function as diodes and are typically connected to subsequent electronic devices such as amplifiers, located apart from each detector. While the advantages of the present invention can be achieved by the use of this conventional arrangement, an alternative embodiment of the present invention will employ low noise preamps attached to each detector pixel. This design reduces stray capacitance caused by the distance between the detector and the amplifier. Stray capacitance results in increased noise. The result is a limiting of the sensitivity of the detector. By fabricating the low noise preamps directly on each pixel detector, the sensitivity of each detector is significantly improved.

The signal from each detector preamp (not shown) is then sent to a series of amplifiers 18 which may comprise for example pulse shaping amplifiers. The analog signal is transmitted from the amplifiers to an analog-to-digital converter 20 for conversion to a digital signal. The analog to digital converters 20 may comprise, for example, a successive approximate analog to digital converter. The digital signals are transmitted from the analog-to-digital converter along line 22 to a processor 24.

As discussed above, the coded aperture 12 is preferably a uniformly redundant array (URA). URA's are a class of arrays known as pseudo-noise arrays. In pseudo-noise arrays the number of occurrences of a particular separation distance between a pair of holes, or ones, is a constant, regardless of the separation distance. That is, the separations are uniformly redundant.

The processor 24 is a programmable computer capable of performing the necessary calculations discussed below with the desired speed. For example, the processor 24 may comprise a digital signal processor (DSP) computer. The processor 24 contains a reconstruction program which establishes the relationship between the object to be imaged, the aperture, and the resulting image. This reconstruction process, in a sense, will unfold the object from the detected signal. This process is referred to as deconvolution. One type of deconvolution method used with uniformly redundant arrays is described in the above discussed article by E. E. Fenimore and T. M. Cannon.

Figure 2:
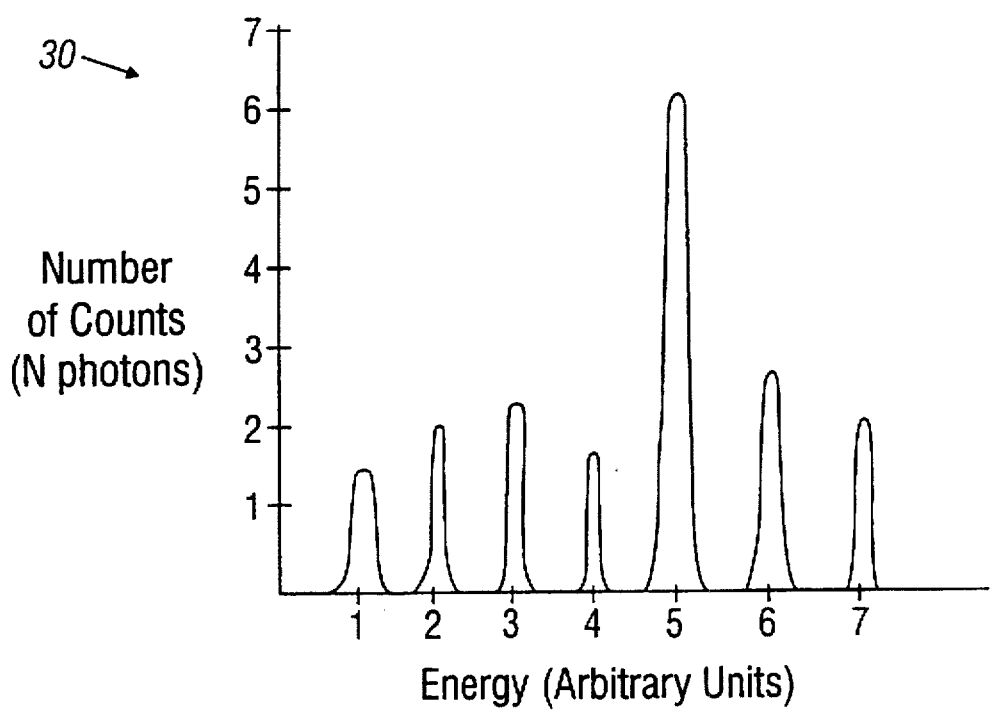
FIG. 2 is a diagram of data gathering performed by the detector of the present invention.

FIG. 2 shows two diagrams illustrating the information gathered by the detector 16 and sent to the processor 24. Diagram 28 shows a representation of the two dimensional array 16. In the preferred embodiment, where the detector has 1024×1024 individual detectors, there will be over 1 million individual detectors. Each pixel is represented by the variable "j". As x-rays are transmitted through the coded aperture 12, each pixel will respond to each individual x-ray photon. In particular, the detector will include a semiconductor crystal in which moving electrons and electron hole clouds will be generated by the ionizing radiation of the x-rays. The electron and hole clouds create charge-pulse signals. The amplitude of these charge-pulse signals will be proportional to the energy of the x-ray photons. By measuring the number of pulses and the amplitude of each pulse, the processor 24 will know the number of photons and their energy for each pixel.

In particular, the processor 24 collects information from each pixel that can be represented by diagram 30. That is, the strength of each signal is categorized into discrete energy levels, which represent specific ranges of energy. Energy is plotted in diagram 30 along the x axis in units of keV. The letter k will represent the particular energy band. The number of photons counted by the detector is plotted on the y axis. The number of photons counted is represented by the variable n. The time frames for measuring counts will depend on the source and can vary from seconds to hours. While processor 24 has, for each pixel, the information which is in the histogram in diagram 30, it is not necessary to actually construct this histogram. For example, it can be seen in diagram 30 that photons of energy level 1, 2, 3, 4, 6, and 7 KeV are received at relatively low rates while a much higher number of photons are detected at energy level 5.

Figure 3:
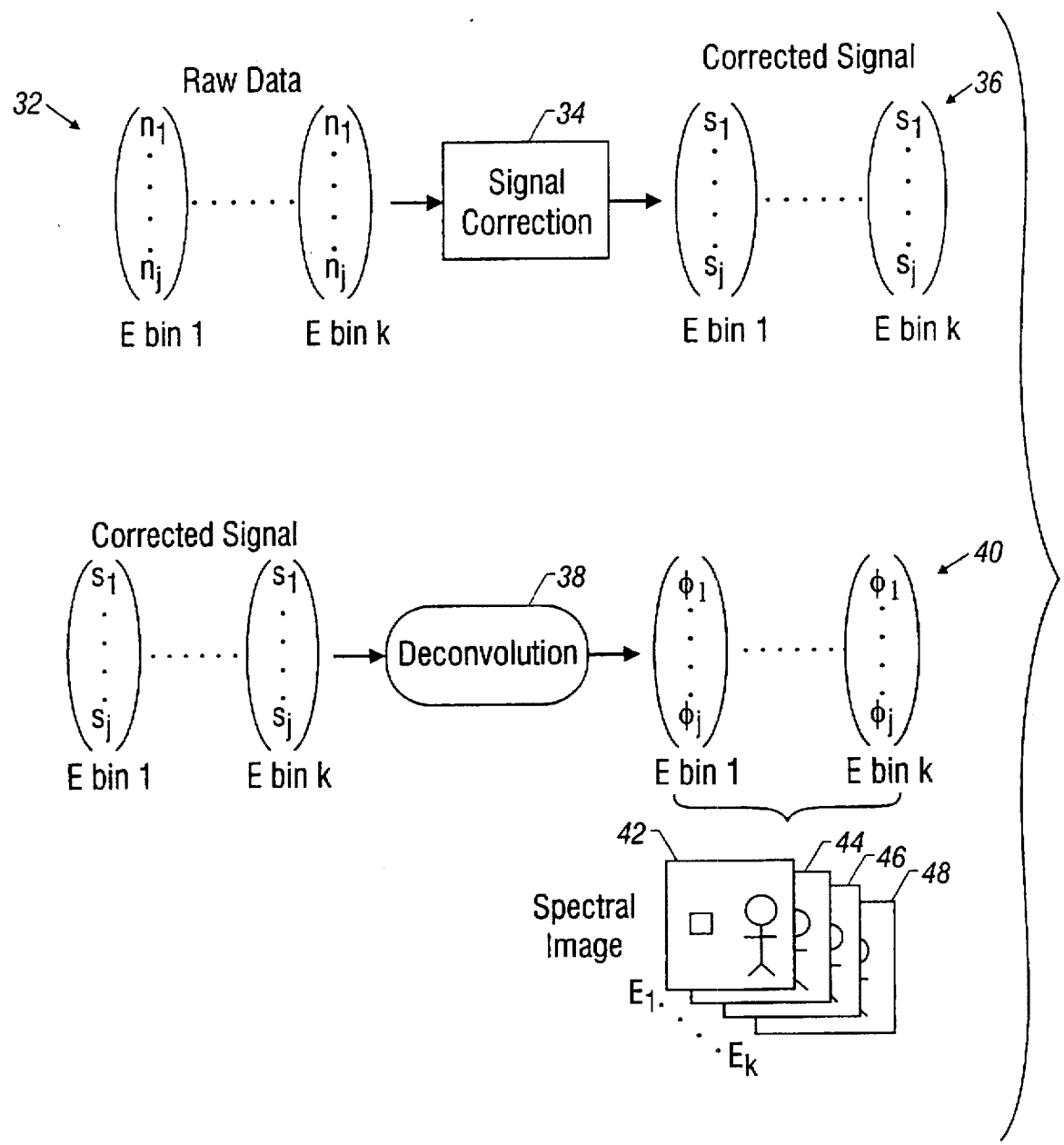
FIG. 3 is a diagram of a deconvolution algorithm calculating the reconstruction of image data in accordance with the present invention.

The manner in which this data is analyzed is illustrated in FIG. 3. Raw digital data output from the detector array 16 is accumulated as a data set, $N_{j,k}$, where $N_{j,k}$ is the integrated number of counts in detector pixel j in energy bin k. An energy bin is a predetermined, relatively narrow, range of energies. This data is represented by matrix 32 where each column contains the number of counts for each pixel in a given energy bin.

The data is corrected by a signal correction unit 34. In general, the signal correction unit performs an algorithm that modifies the raw data to express the values of the signals in terms of signal strength per unit area for each pixel. Also, in this procedure the data is corrected to remove the effects of background x-ray signals. This algorithm calculates a corrected signal $S_{j,k}$, using the equation:

$$S_{j,k}=(N_{j,k}-B_{j,k})/A_{j,k},$$

where $S_{j,k}$ is the corrected signal, $B_{j,k}$ k is the background signal determined by calibration, and $A_{j,k}$ is the effective area of each detector pixel, determined by calibration. The corrected signal will then comprise a corrected signal matrix 36.

The reconstruction of the image data gathered from the x-rays passing through the coded aperture 12, is accomplished by a deconvolution process 38. Deconvolution of the corrected signal matrix 36 into a spectral image is performed by solving the set of equations:

$$D_{i,j}\theta_{i,j}=S_{j,k}$$

$\theta_{i,k}$ is the set of unknown photon fluences for each image pixel i in energy bin k of the spectral image. $D_{i,j}$ is a forward response matrix derived from theory. These equations are solved with the constraint that $\theta_{i,j}$ is greater than or equal to zero. It should be noted that the constraint that $\theta_{i,k}$ be greater than zero is made because the deconvolution calculation can result in negative values. Since intensity values on an image can only be perceived as being either zero, or having some positive value, negative values of intensity cannot be displayed on display unit 26. Accordingly, by solving the deconvolution equation with this constraint, more useful information will be available to generate spectral images because there will be a positive value for each pixel. This increases the spatial resolution.

The forward response matrix is a mathematical representation of the expected response in an ideal instrument detector array after modulation through coded aperture from a point source of unit signal strength positioned at infinity on the instrument centerline. The forward response matrix can be generated mathematically using an ideal description of the instrument or empirically using quantitative methods to include non-ideal effects.

The collected data along with the forward response matrix can be thought of as representing the above set of equations. The data from each detector pixel gives rise to one equation. The image field (or sky field) is the set of unknowns where each field (sky) pixel is one unknown. The deconvolution process can be considered as the process of solving a set of simultaneous equations for a set of unknowns. For further information regarding deconvolution processes use with uniformly redundant arrays, see the above-discussed article by E. E. Fenimore, et al.

The deconvolution process 38 yields spectral image matrix 40 which contains all of the values necessary to reconstruct the original image in each energy bin. For example, resulting images 42, 44, 46 and 48 each comprise images constructed from all j pixels in a single energy bin, $E_1$, $E_2$, $E_3$ and $E_4$ respectively. It will be appreciated that the exact number of energy bins will depend on numerous factors, including the constraints of the application, and the energy resolution of the detector 16.

The processes depicted in FIG. 3 will be implemented by a program operating on processor 24. The spectral images 42-48 may then be displayed on display unit 26.

Figure 4:
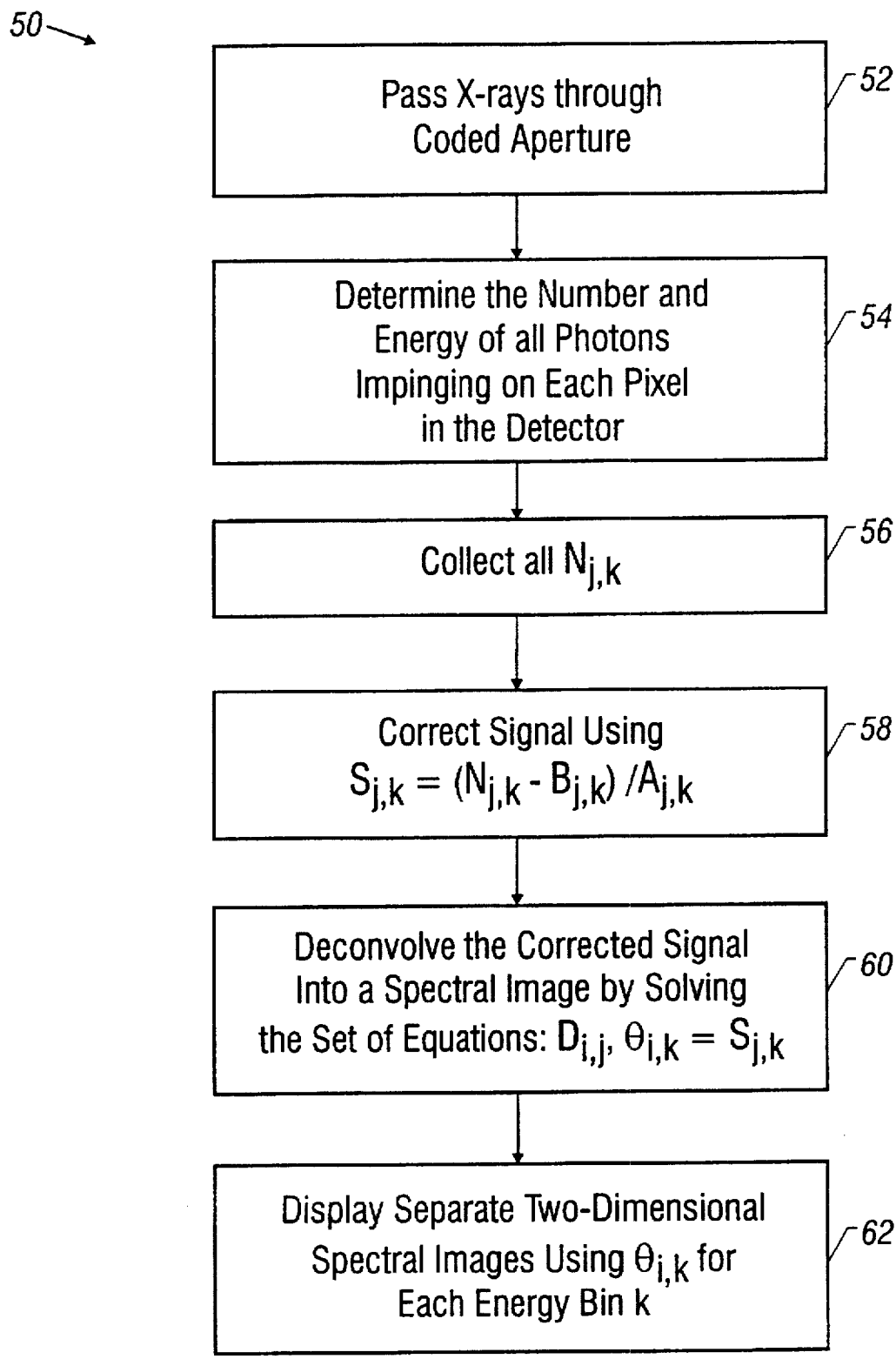
FIG. 4 is a flow chart of the process of producing a spectroscopic image in according to the present invention.

A flow chart of the overall process of one embodiment of the present invention is shown in FIG. 4. This process 60 begins with the passing of x-rays through the coded aperture 12 from the source 15, in step 52. At step 54 each detector in the array 16 determines the number and energy of photons impinging on the detector. At step 56 the processor 24 collects the all $N_{j,k}$, which comprises the number of photon counts in each energy band k for each pixel. At step 58 the signal is corrected using the above-described signal correction algorithm 34. Next, at step 60 the corrected signal is deconvolved into a spectral image by the deconvolution process 38. In step 62, separate two dimensional spectral images 42-48 are displayed using the deconvolution results for each energy bin k.

It should be noted that the output of the present invention is four dimensional data. That is, it contains two dimensional image information comprising the x, y location of each pixel (two dimensions), plus the intensity of that pixel. In addition, the data includes a spectrograph of intensity values throughout the energy spectrum for each pixel.

Although only a few embodiments have been described in detail, those having ordinary skill in the art will certainly understand that many modifications are possible in the preferred embodiment without departing from the teachings thereof. For example, various kinds of x-ray detectors may be used including those without on-pixel preamps. Also, other types of coded apertures, besides uniformly redundant arrays may be used. Furthermore, different deconvolution algorithms can be used. In addition, the techniques of the present invention may be applied to electromagnetic radiation outside of the x-ray region. For example, high energy x-rays above 20-50 KeV, and even gamma rays may be detected by modifying the detector so that it adequately detects these photons.

All such modifications are intended to be encompassed within the following claims.

What is claimed is:

1. A system for detecting high energy photons comprising:
   a coded aperture disposed to receive said photons from a source, wherein said photons passing through the coded aperture generates a predetermined spatial pattern;
   a detector array disposed to receive the photons passing through the coded aperture, the detector array having a plurality of individual detectors, each receiving one pixel of said spatial pattern, said detectors producing an output signal indicating the number of said photons received as well as the energy of each photon, wherein said detectors in said array each comprise deeply depleted high purity silicon detectors; and
   a processor receiving said output signal from each detector and performing a reconstruction operation on said signals to reconstruct the spatial position of each photon that it had prior to passing through the coded aperture, whereby an image of the source is produced.

2. The system of claim 1 wherein said processor also includes means for generating a spectrogram for each pixel comprising the number of photons received in each of a plurality of ranges of energy for each pixel.

3. The system of claim 1 wherein said coded aperture is a uniformly redundant array.

4. The system of claim 1 wherein said coded aperture is composed of gold.

5. The system of claim 1 further comprising a means for displaying separate spectral images of the source, each one comprising one of said images created solely by the photons received in a single energy band.

6. The system of claim 1 wherein said detectors further comprise on-pixel low noise preamps.

7. A system for detecting high energy photons comprising:
   a coded aperture disposed to receive said photons from a source, wherein said photons passing through the coded aperture generates a predetermined spatial pattern;
   a detector array disposed to receive the photons passing through the coded aperture, the detector array having a plurality of individual detectors, each receiving one pixel of said spatial pattern, said detectors producing an output signal indicating the number of said photons received as well as the energy of each photon wherein said detectors in said array each comprise deeply depleted high purity silicon detectors;
   a processor receiving said output signal from each detector and performing a reconstruction operation on said signals to reconstruct the spatial position of each photon that it had prior to passing through the coded aperture, whereby an image of the source is produced; and
   a signal correction unit for normalizing the detector outputs.

8. The system of claim 7 wherein the correction unit calculates a corrected signal $S_{j,k}$, using the equation:

$$S_{j,k}=(N_{j,k}-B_{j,k})/A_{j,k},$$

where j is the number of the pixel, k is the energy bin of the photons detected at the pixel, $S_{j,k}$ is the corrected signal, $N_{j,k}$ is the uncorrected signal, $B_{j,k}$ is the background signal determined by calibration, and $A_{j,k}$ is the effective area of each detector pixel, determined by calibration.

9. The system of claim 8 wherein said reconstruction operation performed by the processor is accomplished by a deconvolution process.

10. The system of claim 9 wherein the deconvolution process performed by the processor is performed by solving the set of equations:

$$D_{i,j}\theta_{i,j}=S_{j,k}$$

where $\theta_{i,k}$ is the photon fluence at image pixel i in energy bin k of the spectral image, and $D_{i,j}$ is a forward response matrix.

11. The system of claim 10 wherein the deconvolution process is performed with the constraint that $\theta_{i,j}$ is greater than or equal to zero.

12. A method of generating spectral images of an x-ray source, comprising:
    passing x-rays from a source through a coded aperture;
    receiving said x-rays in a detector having an individual detector for each pixel;
    measuring the number of photons of said received x-rays reaching each detector;

measuring the energy of said photons of x-rays reaching each detector;

reconstructing the information regarding the number of photons and their energy levels to create an image of the source of x-rays; and calculating a correction signal $S_{j,k}$ using the equation:

$$S_{j,k} = (N_{j,k} - B_{j,k})/A_{j,k},$$

where j is the number of the pixel, k is the energy bin of the photons detected at the pixel, $N_{j,k}$ is the uncorrected signal, $S_{j,k}$ is the corrected signal, $B_{j,k}$ is the background signal determined by calibration, and $A_{j,k}$ is the effective area of each detector pixel, determined by calibration.

13. The method of claim 12 comprising the step of displaying separate spectral images of the x-ray source, each one comprising one of said images created solely by the photons received in a single energy band.

14. The method of claim 12 further comprising displaying the number of counts in each of several energy ranges for an individual pixel detector.

15. The method of claim 12 wherein said reconstruction step is performed by a deconvolution process.

16. The method of claim 15 wherein the deconvolution process is performed by solving the set of equations:

$$D_{i,j} \theta_{i,j} = S_{j,k}$$

where $\theta_{i,k}$ is the photon fluence at image pixel i in energy bin k of the spectral image, and $D_{i,j}$ is a forward response matrix.

17. The method of claim 16 wherein the deconvolution process is performed with the constraint that $\theta_{i,j}$ is greater than or equal to zero.

* * * * *